United States Patent
Nowak et al.

(10) Patent No.: US 12,061,914 B2
(45) Date of Patent: Aug. 13, 2024

(54) USING INTERCHANGEABLE NON-COMPUTE RESOURCES FOR CLOUD-BASED APPLICATIONS

(71) Applicant: Microsoft Technology Licensing, LLC, Redmond, WA (US)

(72) Inventors: Ryan A. Nowak, Seattle, WA (US); Aaron Brady Crawfis, Seattle, WA (US); Vinaya Damle, Sunnyvale, CA (US); Karishma Chawla, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 17/833,454

(22) Filed: Jun. 6, 2022

(65) Prior Publication Data
US 2023/0393861 A1    Dec. 7, 2023

(51) Int. Cl.
*G06F 9/445* (2018.01)
*G06F 8/60* (2018.01)

(52) U.S. Cl.
CPC ............ *G06F 9/44505* (2013.01); *G06F 8/60* (2013.01)

(58) Field of Classification Search
CPC ........................................................ G06F 8/60
See application file for complete search history.

(56) References Cited

U.S. PATENT DOCUMENTS

| | | | | |
|---|---|---|---|---|
| 11,783,062 | B2 * | 10/2023 | Lounsberry | G06F 21/6218 726/30 |
| 2005/0065956 | A1 * | 3/2005 | Brown | G06F 16/252 707/999.102 |
| 2012/0159468 | A1 * | 6/2012 | Joshi | G06F 8/60 717/172 |
| 2015/0095343 | A1 * | 4/2015 | Divilly | H04L 67/63 707/741 |
| 2018/0083937 | A1 | 3/2018 | Jahner et al. | |
| 2022/0284032 | A1 * | 9/2022 | Rao Krishnagi | G06F 16/9566 |

OTHER PUBLICATIONS

"The Twelve-Factor App", Retrieved from: https://12factor.net/, Retrieved on: Apr. 25, 2022, 2 Pages.
"What is Service Connector?", Retrieved from: https://docs.microsoft.com/en-us/azure/service-connector/overview, Mar. 16, 2022, 4 Pages.
"International Search Report and Written Opinion Issued in PCT Application No. PCT/US23/018783", Mailed Date: Jul. 5, 2023, 14 Pages.

* cited by examiner

*Primary Examiner* — Jaweed A Abbaszadeh
*Assistant Examiner* — Cheri L Harrington

(57) ABSTRACT

In examples, a system for using interchangeable non-compute resources is provided. The system includes at least one processor and memory storing instructions that, when executed by the at least one processor, cause the system to: receive a first key corresponding to a first non-compute resource, define a first connection with the first non-compute resource based on the first key, receive a second key corresponding to a second non-compute resource, define a second connection with the second non-compute resource based on the second key, receive an indication corresponding to a selection of the first non-compute resource, and configure the system to interface with the first non-compute resource at a deployment of a generated application.

17 Claims, 14 Drawing Sheets

USING INTERCHANGEABLE NON-COMPUTE RESOURCES FOR CLOUD-BASED APPLICATIONS

BACKGROUND

During the development of a cloud-based application, developers might need compute resources, as well as non-compute resources. The developers may need to specify in the application's code to which non-compute resource the application should be deployed. If the developers then desire for the application to be deployed to a different non-compute resource, they may need to re-write the application's code to specify to which different non-compute resource the application should be deployed. Such systems and methods may make deploying applications across different non-compute resources (e.g., database platforms, caching and storage systems, messaging queues, etc.) which may be running on different underlying platforms (e.g., a cloud platform) difficult, while switching between the different resources, which may be running on different platforms, may be frustrating and inefficient.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to methods, systems, and media for using interchangeable non-compute resources, such as for cloud-based applications.

In some examples, a system for using interchangeable non-compute resources is provided. The system includes at least one processor and memory storing instructions that, when executed by the at least one processor, cause the system to: receive a first key corresponding to a first non-compute resource, define a first connection with the first non-compute resource based on the first key, receive a second key corresponding to a second non-compute resource, define a second connection with the second non-compute resource based on the second key, receive an indication corresponding to a selection of the first non-compute resource, and configure the system to interface with the first non-compute resource at a deployment of a generated application.

In some examples, a method of using interchangeable non-compute resources is provided. The method includes receiving a first key corresponding to a first database, defining a first connection between a service and the first database, based on the first key, receiving a second key corresponding to a second database, defining a second connection between the service and the second database, based on the second key, receiving an indication corresponding to a selection of the first database, and configuring the service to interface with the first database, at a deployment of the service.

In some examples, a method of using interchangeable non-computer resources is provided. The method includes: receiving a plurality of keys each corresponding to a respective one of a plurality of non-compute resources, defining connections between a service and each of the plurality of non-compute resources, based on the plurality of keys, receiving an indication corresponding to a selection of a first non-compute resource of the plurality of non-compute resources, configuring the service to interface with the first non-compute resource, at a deployment of the service, and transmitting, at the deployment, configuration instructions to the selected non-compute resource. The configuration instructions adapt a behavior of the first non-compute resource.

Some examples further include receiving an indication corresponding to a selection of the second non-compute resource, and re-configuring the system to interface with the second non-compute resource at the deployment.

In some examples, the first key and the second key are connection strings.

Some examples further include updating a deployment manifest based on the selection of the first non-compute resource.

In some examples, receiving the first key corresponding to the first non-compute resource further comprises receiving a first set of authentication data corresponding to the first non-compute resource. Further, the defining the first connection between the service and the first non-compute resource, based on the first key, further comprises defining the first connection between the service and the first non-compute resource based on the first key and the first set of authentication data.

Some examples further include transmitting, at the deployment, configuration instructions to the first non-compute resource, whereby the configuration instructions adapt a behavior of the first non-compute resource.

In some examples, the first non-compute resource is one of a database, caching system, or messaging queue.

Some examples further include receiving an indication corresponding to a selection of a second non-compute resource of the plurality of non-compute resources, and re-configuring the service to interface with the second non-compute resource, at the deployment of the service.

In some examples, the re-configuring of the service includes updating the deployment manifest, based on the second non-compute resource.

In some examples, the receiving of the plurality of keys each corresponding to a respective one of a plurality of non-compute resources further comprises receiving a plurality of sets of authentication data. Further, the defining of the connections between the services and the non-compute resources, based on the plurality of keys, further comprises defining the connections between the services and the non-compute resources, based on the plurality of keys and the sets of authentication data.

In some examples, at least one of the plurality of non-compute resources are one of a database, caching system, or messaging queue.

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTION OF THE DRAWINGS

Non-limiting and non-exhaustive examples are described with reference to the following Figures.

DETAILED DESCRIPTION

Figure 1:
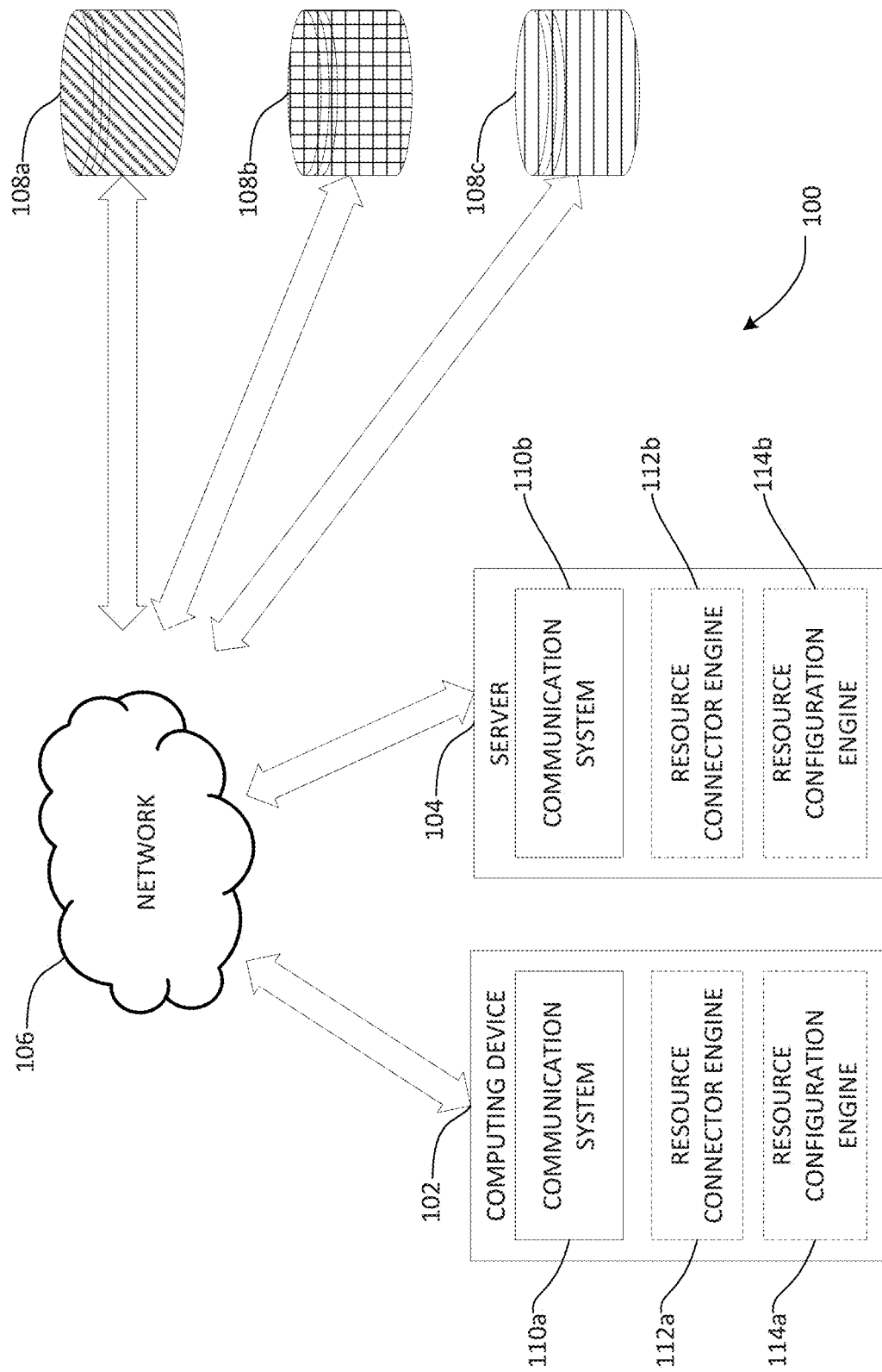
FIG. 1 illustrates an overview of an example system for using interchangeable non-compute resources according to aspects described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

As mentioned above, during the development of a cloud-based application, developers might need compute resources as well as non-compute resources. For example, a compute resource may be a device that includes computational hardware, such as a processor and memory. Examples of compute resources may include a computer and/or a server. Conversely, a non-compute resource may be a service that is used by a compute resource to store and retrieve data therefrom. For example, a compute resource may include a processor, such as a central processing unit (CPU) to perform computations and/or data movement operations (e.g., read/write commands). However, commands that are executed by the CPU may be computationally expensive, as compared to a non-compute resource that may not execute commands using a CPU. To this end, a developer may program and deploy an application on a compute resource (e.g., a computer or server), and connect their application to a non-compute resource (e.g., a database service) to track metrics from users who may be using a service related to the programmed application.

The developers may need to specify in the application's code to which non-compute resource the application should be deployed. If the developers then desire for the application to be deployed to a different non-compute resource, they may need to re-write the application's code to specify this different non-compute resource. Such systems and methods may make deploying applications across different non-compute resources (e.g., databases, caching systems, messaging queues, etc.) which may each be running on one of a plurality of different underlying platforms (e.g., a cloud platform) difficult, while switching between the different resources that are running on different platforms may be frustrating and inefficient, for example because the application's code needs to be rewritten every time that the developer desires to interchange the non-compute resource.

Cloud-native applications are not just composed of compute, storage, networking, and identity resources, but also the connections and references between them. A developer may be concerned with one or more application's dependencies on resources like databases and message queues. The developer may want to express what dependencies are needed, and how the code will access those dependencies, while minimizing a degree to which software components are dependent upon each other (e.g., coupling) to increase independence and portability of a service. An application model that seeks to fully describe an application and its requirements may require the ability to model and deploy connections to the underlying platform.

In most deployment systems today, connections are expressed as resource references in templating languages. However, at deploy time these references are resolved into values and deployed to the target platform. Once deployed, the source of the referenced value is lost, and there may be no information regarding from where values are pulled.

Developers often use common APIs and connection strings as interfaces between services and infrastructure for portability across a development platform and a cloud platform, and also, in some instances, across a plurality of cloud platforms. Switching between cloud platforms or non-compute resources (e.g., which may be associated with different providers) may require updating configurations to pass in one or more of a username, password, host, port, or connection string values.

Accordingly, aspects of the present disclosure relate to methods and systems for using interchangeable non-compute resources, such as for building cloud-based application. Generally, mechanisms disclosed herein create an abstraction layer that allows a user to select and switch between one or more non-compute resources without needing to change application code. Therefore, a developer may write one set of application code and deploy the application different places without needing to update code of the application to specify which non-compute references need to be referenced.

More specifically, mechanisms disclosed herein may include receiving a plurality of keys that each correspond to a respective one of a plurality of non-compute resources, defining connections between a service and each of the plurality of non-compute resources, based on the plurality of keys, receiving an indication corresponding to a section of a first non-compute resource of the plurality of non-compute resources, configuring the service to interface with the first non-compute resource, at a deployment of the service, receiving an indication corresponding to a selection of a second non-compute resource of the plurality of non-compute resources, and re-configuring the service to interface with the second non-compute resource. A developer may not have to update code of the service or of an application corresponding to the service, for the service to be re-configured to interface with the second non-compute resource.

As one specific example according to some aspects described herein, a developer may be building a shuttle scheduling service for a corporate campus. The developer's application may be a front end container that connects to a relational database server to track a user's shuttle rides. The developer may want to run their application locally with a container, and then switch to a managed database on a cloud server when the application is deployed. The developer may author a deployment manifest specifying details corresponding to aspects of the front end container. When the developer wants to deploy his application to the managed database on the cloud server, the deployment manifest may be updated to switch between different non-compute resources (e.g., one or more cloud database resources), based on a parameter, such as an indication of a selection of one or more parameters. When one or more non-compute resources interfacing with the container are interchanged, the developer's code may be unchanged.

FIG. 1 shows an example of a system 100 for using interchangeable non-compute resources, in accordance with some aspects of the disclosed subject matter. The system 100 includes one or more computing devices 102, one or more servers 104, a communication network or network 106, and a plurality of non-compute resources 108a, 108b, and 108c.

Computing device 102 may include a communication system 110a, a resource connector engine 112a, and a resource configuration engine 114a. In some examples, computing device 102 can execute at least a portion of resource connector component 112a to connect an application or service to a non-compute resource at a deployment of the application of service. Further, in some examples, computing device 102 can execute at least a portion of resource configuration component 114a to configure or adapt specific behavior of a non-compute resource (e.g., a database, caching system, messaging queue, etc.) which may be run on one of a plurality of different underlying platforms, such as a cloud platform.

Server 104 may include a communication system 110b, a resource connector engine 112b, and a resource configuration engine 114b. In some examples, server 104 can execute at least a portion of resource connector component 112b to connect an application or service to a resource at a deployment of the application of service. Further, in some examples, server 104 can execute at least a portion of resource configuration component 114b to configure or adapt specific behavior of a non-compute resource (e.g., a database, caching system, messaging queue, etc.) which may be run on one of a plurality of different underlying platforms, such as a cloud platform.

Additionally, or alternatively, in some examples, computing device 102 can communicate data to the server 104 over the communication network 106, which can execute at least a portion of resource connector component 112a and/or 112b and resource configuration component 114a and/or 114b. In some examples, resource connector component 112a and/or 112b may execute one or more portions of method/process 600, described below in connection with FIG. 6. Further, in some examples, resource configuration component 114a and/or 114b may execute one or more portions of method/process 600, described below in connection with FIG. 6.

The communication network 106 can communicate data from the computing device 102 and/or the server 104 to one or more of the plurality of non-compute resources 108a, 108b, and 108c. The plurality of non-compute resources 108a, 108b, and 108c may include one or more of a cloud database, such as a managed cloud database, a relational database, such as a distributed relational database, or sequel server containers. Accordingly, one or more of the plurality of non-compute resources may be databases (e.g., relational databases, cloud databases, managed databases, distributed databases, etc.). Additionally, or alternatively, one or more of the plurality of non-compute resources may be a caching system or messaging queue. Each of the plurality of non-compute resources may be configured to run on one of a plurality of underlying platforms, such as, for example, a cloud platform. Other types of non-compute resources to which data may be deployed from a cloud-based application may be recognized by those of ordinary skill in the art.

In some examples, computing device 102 and/or server 104 can be any suitable computing device or combination of devices that may be used by a requestor, such as a desktop computer, a laptop computer, a smartphone, a tablet computer, a wearable computer, a server computer, a virtual machine being executed by a physical computing device, a web server, etc. Further, in some examples, there may be a plurality of computing device 102 and/or a plurality of servers 104. While the illustrated example shows one computing device 102, one server 104, and three non-compute resources 108a, 108b, 108c, it should be recognized by those of ordinary skill in the art that there may be any number of computing devices 102, servers 104, and/or non-compute resources 108a, 108b, 108c.

In some examples, communication network 106 can be any suitable communication network or combination of communication networks. For example, communication network 106 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard), a wired network, etc. In some examples, communication network 106 can be a local area network (LAN), a wide area network (WAN), a public network (e.g., the Internet), a private or semi-private network (e.g., a corporate or university intranet), any other suitable type of network, or any suitable combination of networks. Communication links (arrows) shown in FIG. 1 can each be any suitable communications link or combination of communication links, such as wired links, fiber optics links, Wi-Fi links, Bluetooth links, cellular links, etc.

Figure 2:
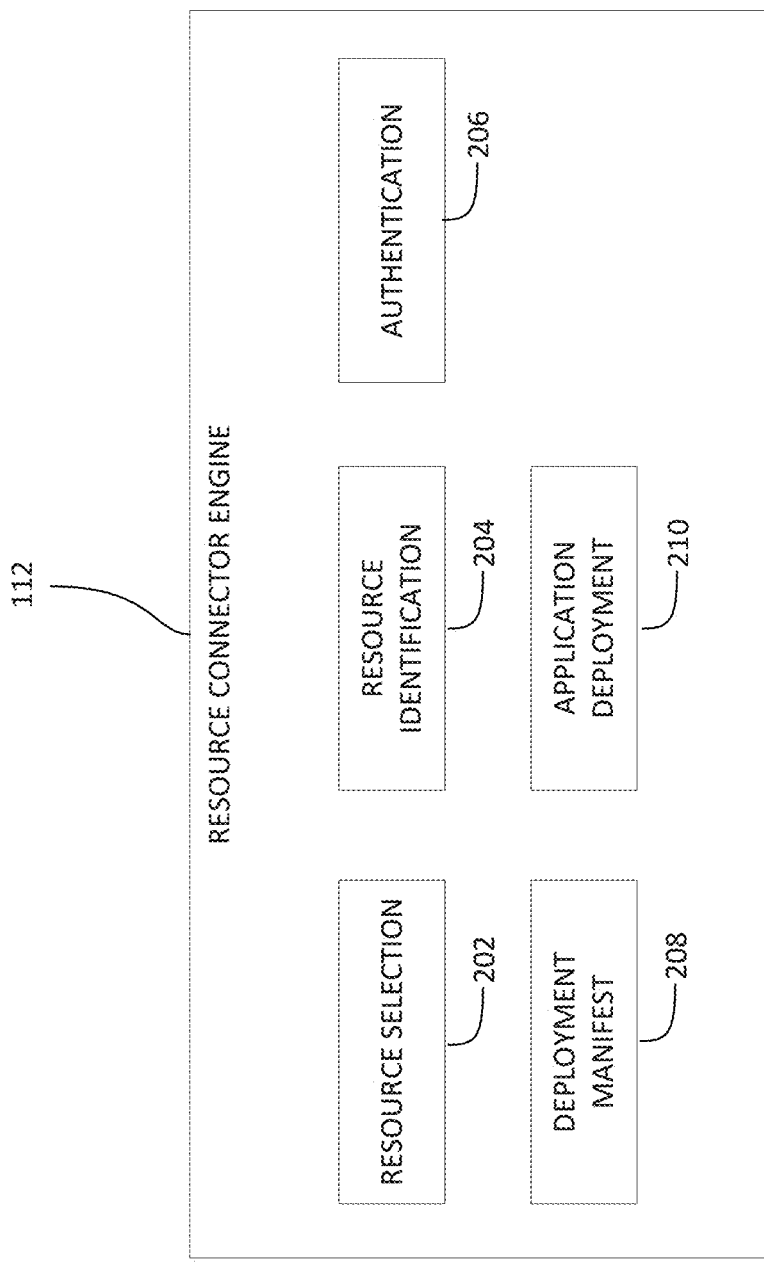
FIG. 2 illustrates a detailed schematic of a portion of the example system of FIG. 1 according to aspects described herein.

FIG. 2 illustrates a detailed schematic of the resource connector engine or component 112 of the example system 100 for using interchangeable non-compute resources. The resource connector component 112 includes a plurality of components or engines that implement various aspects of the resource connector component 112. For example, the resource connector component 112 includes a resource selection component 202, a resource identification component 204, an authentication component 206, a deployment manifest 208, and/or an application deployment component 210.

The resource selection component 202 may contain (e.g., stored in a memory location corresponding to the resource selection component 202), and/or generate an indication of one or more non-compute resources that are selected by a user to interface with a service or application. For example, the indication may correspond to a selection of one or more of the plurality of non-compute resources 108a, 108b, 108c discussed earlier herein with respect to FIG. 1. The resource selection component 202 may receive a user-input corresponding to the selected non-compute resource. Alternatively, a behavior of one or more non-compute resources may generate an indication for a different non-compute resource to be selected. For example, if a first non-compute resource has an upper threshold of network traffic that is being approached, then an indication corresponding to a second non-compute resource may be generated, if the second non-compute resource has a threshold of network traffic that is higher than the first non-compute resource. The selection of the non-compute resource may not require changing any code of the service or application.

The resource identification component 204 may contain (e.g., stored in a memory location corresponding to the resource identification component 204), and/or generate an indication of one or more non-compute resources that can be connected to a specific service or application. For example, one or more non-compute resources (e.g., from the plurality of non-compute resources 108a, 108b, 108c) may be identified by connecting to a specific server, or connecting to a specific computing device, or logging into a specific network connection. Alternatively, in some examples, the one or more non-compute resources may be identified by receiving a key, such a connection string, corresponding to one or more non-compute resources. Alternatively, the resource identification component 204 may contain an indication of one or more non-compute resources that are identified by a user, such as via an input parameter or other type of system configuration.

The authentication component 206 may contain (e.g., stored in a memory location corresponding to the authentication component 206), and/or generate an indication of authentication data that may be used to interface a service or application with one or more non-compute resources. For example, the authentication data may include a username and password corresponding to a specific user or groups of users who have been granted access to a resource. Additionally, or alternatively, the authentication data may include multi-factor authentication data. For example, a non-compute resource may provide a multi-factor authentication code to user, such as via an email, phone number, application notification, etc. The authentication component 206 may obtain the multi-factor authentication data (e.g., from a user, directly from the email, phone number, application notification, etc.). Additionally, or alternatively, the authentication component 206 may otherwise receive authentication data, such as, for example, that is provided by information from a user, or that is transmitted from information from a database that stores authentication data corresponding to the specific users or groups of users, for each non-compute resource with which a service or application may be configured to interface.

In some examples, the authentication component 206 may be used in cooperation with the resource identification component 204. For example, a connection may be defined between a non-compute resource and a service, based on one or more keys, as well as one or more sets of authentication data. For instance, if there are two non-compute resources, then a first key and a first set of authentication data may correspond to a first of the two non-compute resources, and a second key and a second set of authentication data may correspond to a second of the two non-compute resources. Accordingly, two non-compute resources may be identified by receiving two sets of keys and/or authentication data corresponding to two different non-compute resources.

The deployment manifest component 208 may contain (e.g., stored in a memory location corresponding to the deployment manifest component 208), and/or generate an indication of a deployment manifest for an application that may be deployed to one or more non-compute resources. For example, services described herein may be built by a developer to accomplish one or more tasks. The service may include one or more applications that may be run locally or via a non-compute resource (e.g., a cloud database). The deployment manifest may be generated when the application is deployed to the non-compute resource. The deployment manifest may include instructions corresponding to which of a plurality of non-compute resources an application will be configured to interface therewith.

The application deployment component 210 may contain (e.g., stored in a memory location corresponding to the application deployment component 210), and/or generate instructions that, when executed by a processor, cause an application to be deployed. For example, an application may be deployed to one of a plurality of non-compute resources (e.g., resources 108a, 108b, 108c of FIG. 1). The application deployment component 210 may compile source code corresponding to the application. Additionally, or alternatively, the application deployment component 210 may build the application. The built application may then be transmitted from a host side computing device or server (e.g., computing device 102 and/or server 104) to one or more non-compute resources (e.g., resources 108a, 108b, 108c). The non-compute resources 108 may be remote from the host side computing device or server. For example, the non-compute resources 108 may be running one or more remote servers, such as, for examples, one or more remote servers that are stored in one or more data centers, which are remote from the host side computing device or server.

Generally, the resource connector engine 112 acts as an abstract connector that increases portability of an application or service. The resource connector engine 112 may increase portability for an application or service by allowing for the application or service to interchangeably interface with any one of a plurality of non-compute resources, without requiring a developer to re-code the application or service.

Figure 3:
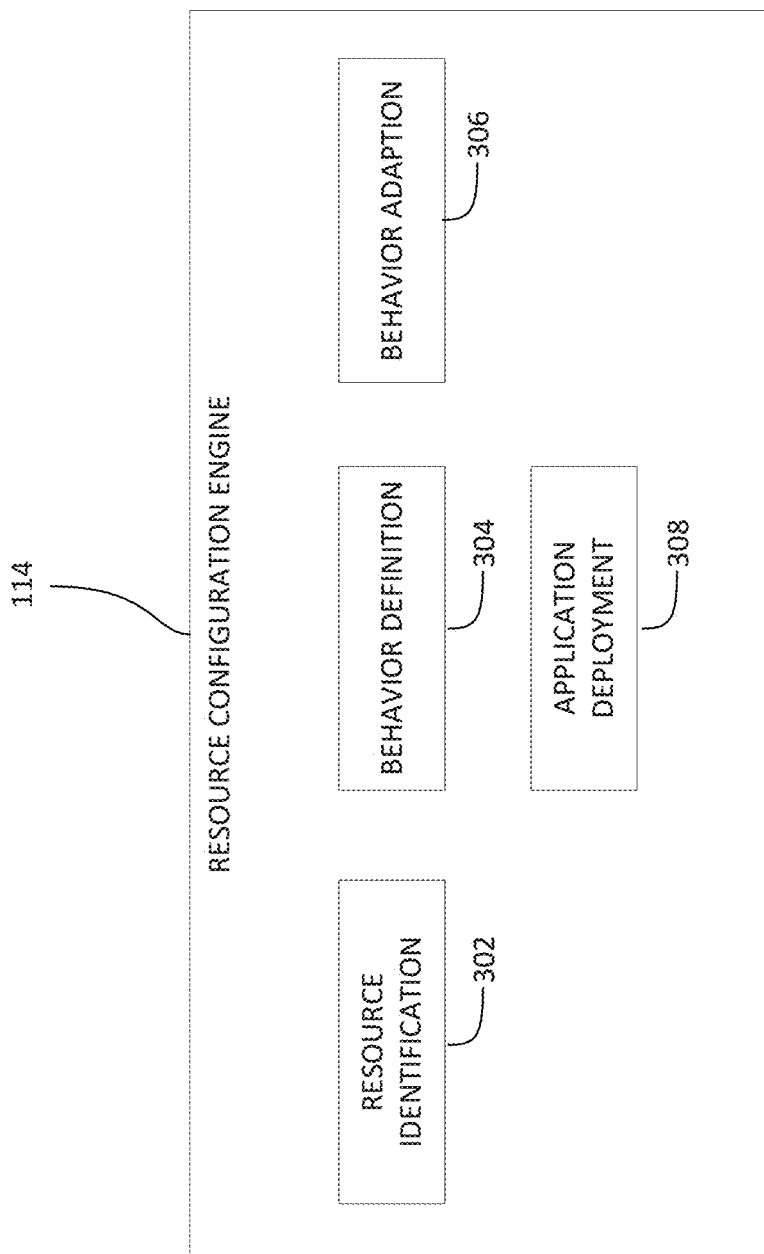
FIG. 3 illustrates a detailed schematic of a portion of the example system of FIG. 1 according to aspects described herein.

FIG. 3 illustrates a detailed schematic of the resource configuration engine 114 of the example system 100 for using interchangeable non-compute resources. The resource configuration engine 114 includes a plurality of components or engines that implement various aspects of the resource configuration component 114. For example, the resource configuration component 114 includes a resource identification component 302, a behavior definition component 304, a behavior adaption component 306, and an application deployment component 308.

The resource identification component 302 may contain (e.g., stored in a memory location corresponding to the resource selection component 302), and/or generate an indication of one or more non-compute resources that can be configured by a specific service or application. For example, one or more non-compute resources (e.g., from the plurality of non-compute resources 108a, 108b, 108c) may be identified by connecting to a specific server, or connecting to a specific computing device, or logging into a specific network connection. Alternatively, in some examples, the one or more non-compute resources may be identified by receiving a key, such a connection string, corresponding to one or more non-compute resources.

Alternatively, the resource identification component 302 may contain an indication of one or more non-compute resources that are identified by a user, such as via an input parameter or other type of system configuration, wherein the one or more non-compute resources are capable of having one or more behaviors adapted using mechanisms described herein.

In some examples, the resource identification component 302 may be similar to the resource identification component 204. However, in some examples, the resource identification component 302 may be different than the resource identification component 204, such as in instances where the resource identification component 204 identified a non-compute resource that cannot be configured to have its behavior adapted using mechanisms described herein, for example, due to a configuration of the non-compute resource and/or a pre-configured setting of the non-compute resource.

The behavior definition component 304 may contain (e.g., stored in a memory location corresponding to the behavior definition component 304), and/or generate an indication of one or more behaviors with which a non-compute resource may be adapted. One example of a defined behavior may be, in instances where one or more non-compute resources are databases, defining a new table within the one or more non-compute resources. The new table may be a state store (e.g., a data store containing metadata corresponding to one or more data states and/or state operations). Further examples of behaviors that may be defined could include one or more of read operations, transaction operations, encryption operations, or any other configurable database operations that may be recognized by one of ordinary skill in the art.

The behavior adaption component 306 may contain (e.g., stored in a memory location corresponding to the behavior adaption component 306), and/or generate computer-readable instructions that when executed, by a processor, cause a behavior of one or more non-compute resources to be adapted. For example, the behavior of the one or more non-compute resources may be adapted to implement one or more of the behavior definitions contained within and/or generated by the behavior definition component 304.

The application deployment component 308 may contain (e.g., stored in a memory location corresponding to the application deployment component 308), and/or generate instructions that, when executed by a processor, cause an application to be deployed. For example, an application may be deployed that includes the instructions of behavior adaption component 306 to adapt a behavior of one or more non-compute resources. The application deployment component 308 may compile source code corresponding to the application. Additionally, or alternatively, the application deployment component 308 may compile source code corresponding to one or more behaviors with which a non-compute resource is configured to be adapted.

Additionally, or alternatively, the application deployment component 308 may build the application. The built application may then be transmitted from a host side computing device or server (e.g., computing device 102 and/or server 104) to one or more non-compute resources (e.g., resources 108a, 108b, 108c). The non-compute resources 108a, 108b, 108c may be remote from the host side computing device or server. For example, the non-compute resources 108a, 108b, 108c may be running on one or more remote servers, such as, for examples, one or more remote servers that are stored in one or more data centers, which are remote from the host side computing device or server. A behavior of the one or more non-compute resources may be adapted based on receipt of the deployed application. Additionally, or alternatively, a behavior of the one or more non-compute resources may be adapted based on an execution of instructions received with the deployed application.

Generally, the resource configuration component 114 allows for non-compute resources to be dynamically provisioned, after an application is deployed thereto, according to aspects herein (e.g., via the resource connector component 112). Specifically, the resource configuration component 114, can allow for specific behavior to be configured, based on behavior definitions defined by a user (e.g., a developer). Such configurability may improve a user's experience because one or more non-compute resources could be configured automatically, using mechanisms disclosed herein.

Figure 4:
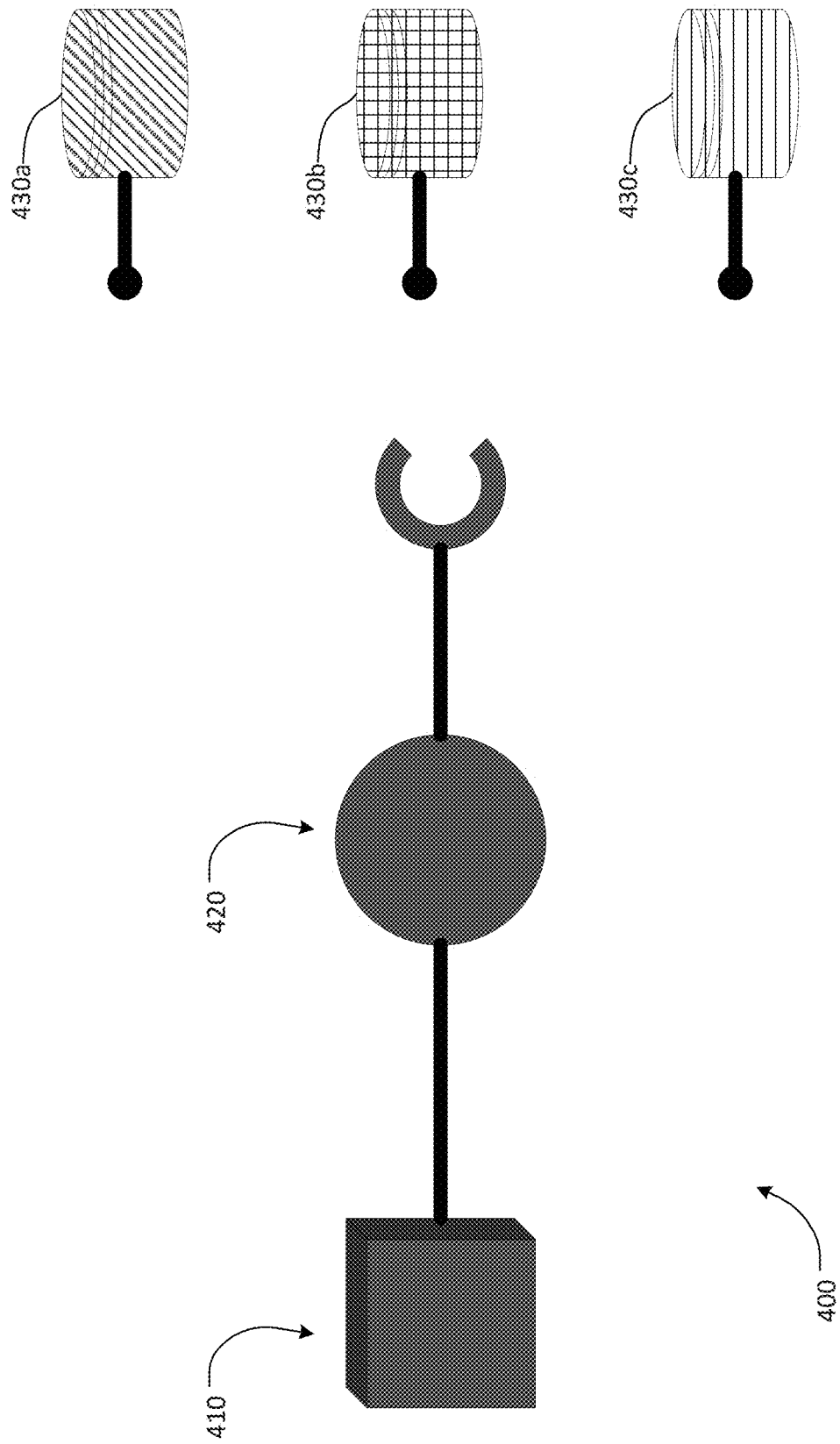
FIG. 4 illustrates an example system for using interchangeable non-compute resources according to aspects described herein.

FIG. 4 illustrates an example system 400 for using interchangeable non-compute resources according to aspects described herein. The system 400 includes a service 410, a connector or abstraction layer 420, and a plurality of non-compute resources, such as a first non-compute resource 430a, a second non-compute resource 430b, and a third non-compute resource 430c.

The service 410 may be a frontend image or container. For example, the service 410 may include a lightweight, stand-alone, executable package of software that includes everything needed to run an application (e.g., code, runtime, system tools, system libraries, settings, etc.). The service 410 may further include additional configuration options, such as, for example, network connections and storage options. The service 410 may include an application that has been programmed by a developer.

As discussed earlier herein, a developer may program an application for a service, such as service 410. The developer may decide initially to run the application locally, with a frontend container (e.g., service 410), and then later decide to switch to one of a plurality of non-compute resources (e.g., one of the non-compute resources 430a, 430b, 430c). The plurality of non-compute resources 430a, 430b, 430c may be similar to the plurality of non-compute resources 108a, 108b, 108c discussed earlier herein with respect to FIG. 1. For example, the plurality of non-compute resources 430a, 430b, 430c may include one or more of a cloud database, such as a managed cloud database, a relational database, such as a distributed relational database, or sequel server containers. Accordingly, one or more of the plurality of non-compute resources 430a, 430b, 430c may be databases (e.g., relational databases, cloud databases, managed databases, distributed databases, etc.). Other types of non-compute resources to which data may be deployed from a cloud-based application may be recognized by those of ordinary skill in the art.

After switching from a local container, such as service 410, to a cloud database, such as one of the plurality of non-compute resources 430a, 430b, 430c, a developer may decide to switch to a different one of the plurality of non-compute resources 430a, 430b, 430c. For example, different non-compute resources may have varying advantages or disadvantages for interfacing with a service. Regardless, an advantage of mechanisms disclosed herein may be ease and portability to interchange non-compute resources with which a service may interface. Therefore, for varying factors such as scalability, cost, data usage observability, storage availability, etc., a developer has the freedom to interchange non-compute resources, without having to redevelop a source code of the application.

The abstraction layer or connector 420 may comprise a plurality of components or engines. For example, the connector 420 may include, implement, and/or correspond to one or more aspects of the resource connector component 112, discussed earlier herein with respect to FIGS. 1 and 2.

Additionally, or alternatively, the connector 420 may include, implement, and/or correspond to one or more aspects of the resource configuration component 114, discussed earlier herein with respect to FIGS. 1 and 3.

Figure 5A:
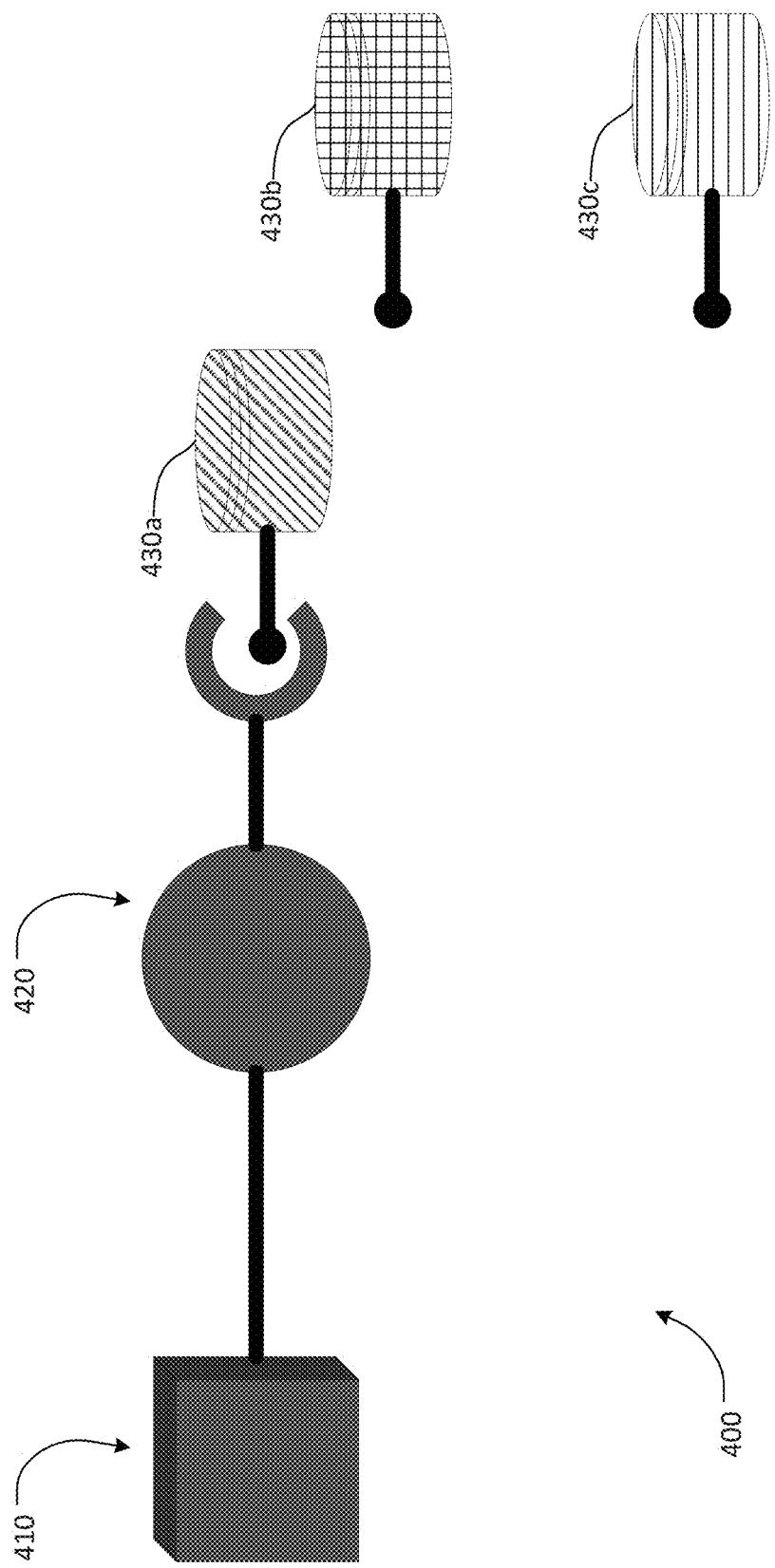
FIG. 5A illustrates the example system of FIG. 4 in a first configuration according to aspects described herein.
Figure 5B:
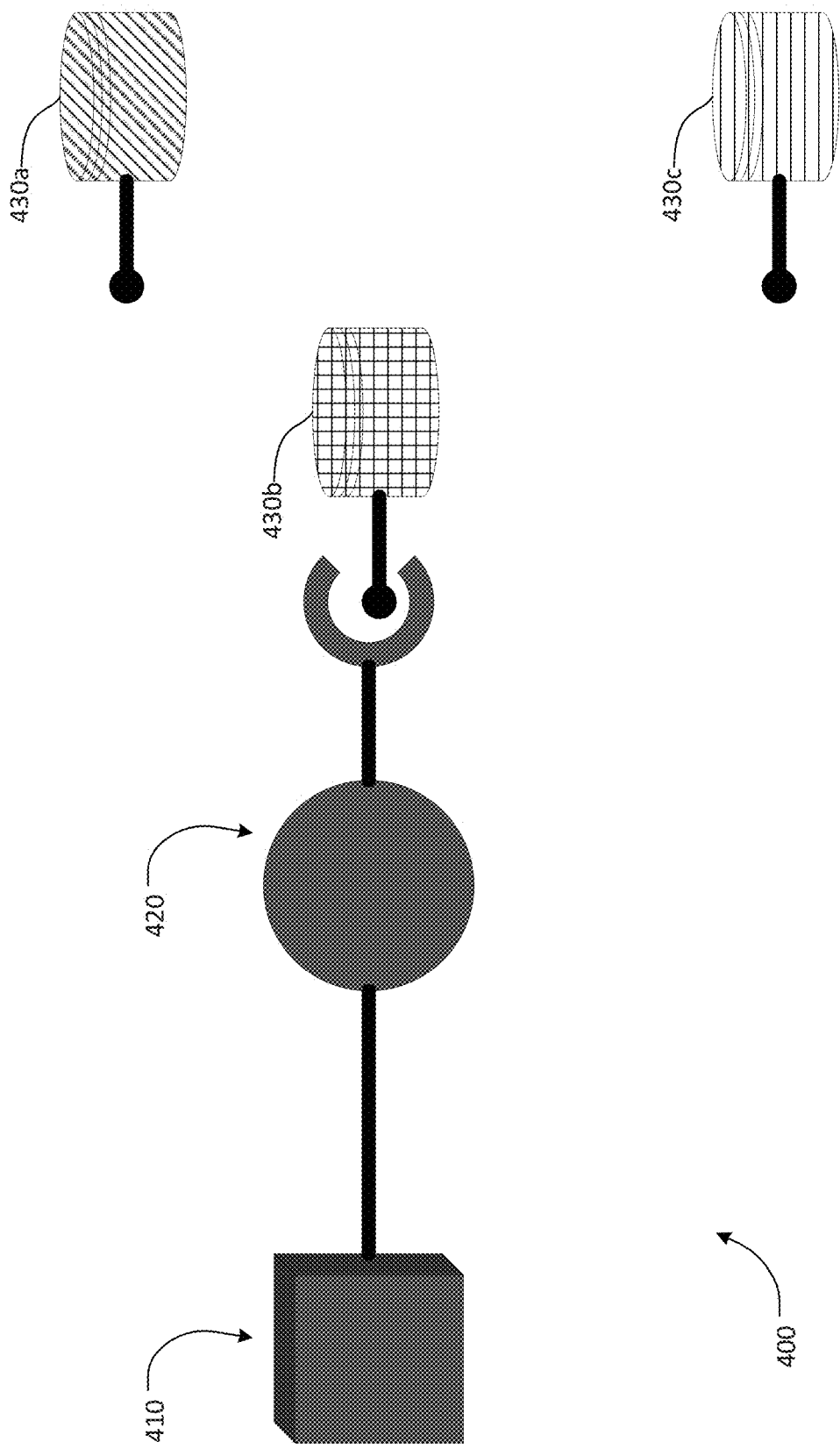
FIG. 5B illustrates the example system of FIG. 4 in a second configuration according to aspects described herein.
Figure 5C:
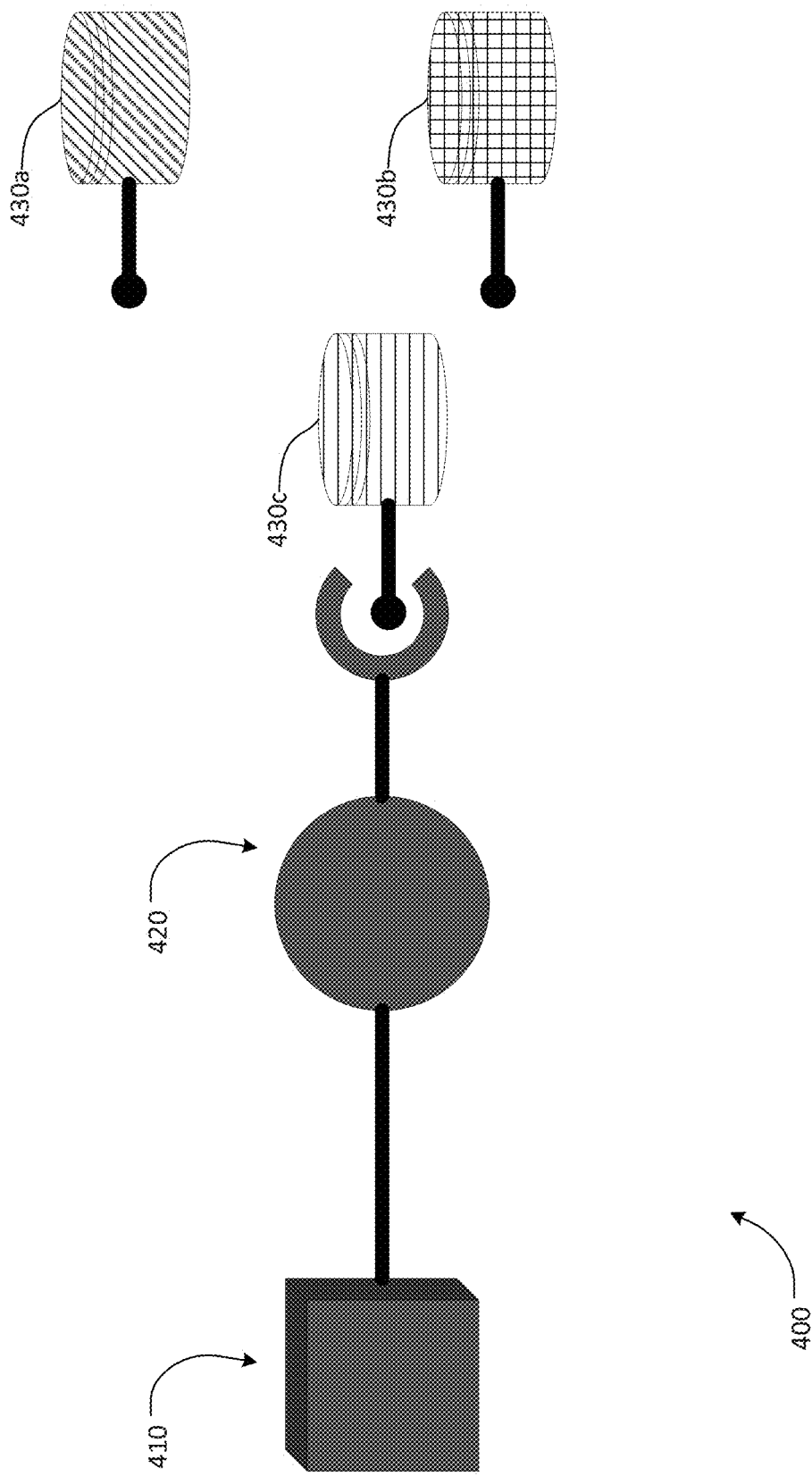
FIG. 5C illustrates the example system of FIG. 4 in a third configuration according to aspects described herein.

FIGS. 5A-5C illustrate the example system 400 of FIG. 4 in a first configuration, second configuration, and third configuration, respectively, according to aspects described herein. Specifically, FIG. 5A illustrates the example system 400 wherein the service 410 is configured to interface with the first non-compute resource 430a, via the connector 420. FIG. 5B illustrates the example system 400 wherein the service 410 is configured to interface with the second non-compute resource 430b, via the connector 420. FIG. 5C illustrates the example system 400 wherein the service 410 is configured to interface with the third non-compute resource 430c, via the connector 420.

Each of the plurality of non-compute resources 430a, 430b, 430c may include a corresponding key, such as a connection string, which the connector 420 may use to interface the service with a selected one of the plurality of non-compute resources. While in some examples, the key may be a connection string (e.g., a unique string value that corresponds to a user being able to access the non-compute resource), in other examples, the key may be a integer, or a float value, or another data type that corresponds to a user's being provided access to a resource.

A user or developer may provide an indication to system 400 indicative of which of the plurality of non-compute resources 430a, 430b, 430c a user wants to use. For example, a user may build a shuttle scheduling service for a corporate campus. The shuttle scheduling service may be a front end container, such as container 410. The shuttle scheduling service may be configured to interface with a cloud database (e.g., one of the plurality of non-compute resources 430a, 430b, 430c) to track one or more metrics of the shuttle scheduling service, such as, for example, tracking a number of user shuttle rides, tracking popular times at which the shuttle scheduling service is accessed, tracking geographic locations from which the shuttle scheduling service is accessed, etc. Different resources of the plurality of non-compute resources 430a, 430b, 430c may provide access to different metrics that a developer may find to be valuable. Accordingly, ease and portability of switching between different non-compute resources may also be valuable to developers.

Figure 6:
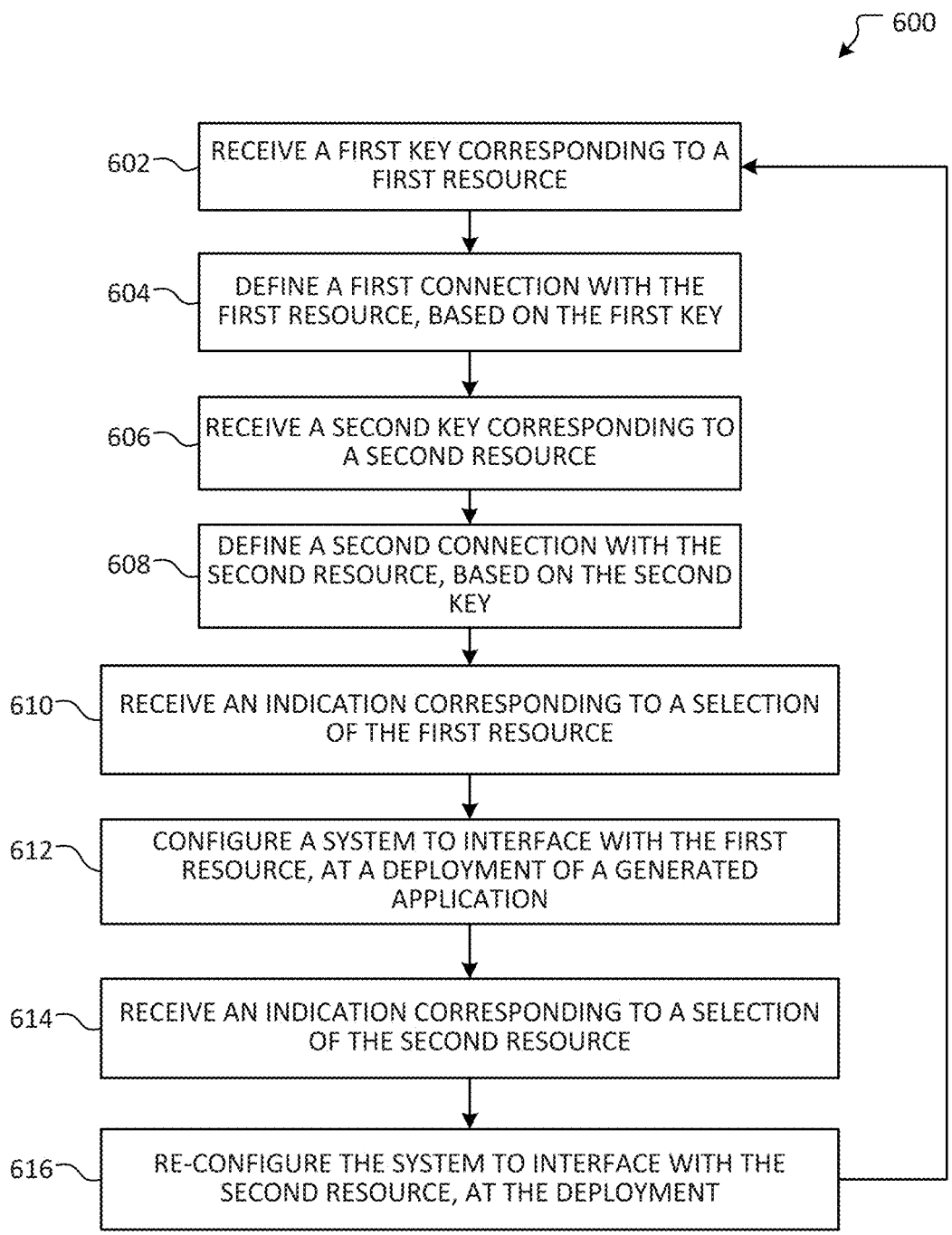
FIG. 6 illustrates an example method of using interchangeable non-compute resources according to aspects described herein.

FIG. 6 illustrates an example method 600 of using interchangeable non-compute resources. In examples, aspects of method 600 are performed by a device, such as computing device 102 and/or server 104, discussed above with respect to FIG. 1.

Method 600 beings at operation 602, where a first key is received. The first key corresponds to a first resource (e.g., non-compute resource). The first resource may be similar to one of the plurality of non-compute resources 108a, 108b, 108c or 430a, 430b, 430c discussed earlier herein with respect to FIGS. 1 and 4-5C. In some examples, the first key may be a connection string. The connection string may be a unique string value that corresponds to a user being able to access the first resource. In other examples, the first key may be an integer, or a float value, or another data type that corresponds to a user being provided access to a resource.

At operation 604, a first connection is defined with the first resource, based on the first key. The first connection may be instructions in a deployment manifest that, when executed, are configured to interface a service or application with the first resource. The first connection may be defined by one or more aspects of the resource connector component 112. For example, the first resource may be identified by the resource identification component 204 and/or a deployment manifest updated and/or generated by the deployment manifest component 208.

At operation 606, a second key is received. The second key corresponds to a second resource (e.g., non-compute resource). The second resource may be similar to one of the plurality of non-compute resources 108a, 108b, 108c or 430a, 430b, 430c discussed earlier herein with respect to FIGS. 1 and 4-5C. In some examples, the second key may be a connection string. The connection string may be a unique string value that corresponds to a user being able to access the first resource. In other examples, the first key may be an integer, or a float value, or another data type that corresponds to a user being provided access to a resource.

At operation 608, a second connection is defined with the second resource, based on the second key. The second connection may be instructions in a deployment manifest that, when executed, are configured to interface a service or application with the second resource. The second connection may be defined by one or more aspects of the resource connector component 112. For example, the second resource may be identified by the resource identification component 204 and/or a deployment manifest updated and/or generated by the deployment manifest component 208.

At operation 610, an indication is received corresponding to a selection of the first resource (e.g., a non-compute resource). The indication may be received or generated by the resource selection component 202 described earlier herein with respect to FIG. 2. Generally, a user may select one of a plurality of non-compute resources (e.g., a first resource or a second resource), with which their service or application will be configured to interface.

At operation 612, a system is configured to interface with the first resource, at a deployment of a generated application. For example, a service or application may transfer data to the first resource. Additionally, or alternatively, the service or application may transfer instructions which, when executed, generate data within the first resource. Additionally, or alternatively, a service or application may receive data from the first resource, such as one or more metrics related to how consumers are accessing, modifying, or otherwise interacting with the first resource (e.g., reading data, manipulating data, writing data, etc.).

At operation 614, an indication is received that corresponds to a selection of the second resource, at deployment. The indication may be received or generated by the resource selection component 202 described earlier herein with respect to FIG. 2. Generally, a user may select one of a plurality of non-compute resources (e.g., a first resource or a second resource), with which their service or application will be configured to interface. Further, the user may then select a second of the plurality of non-compute resources (e.g., the other of the first resource or the second resource), with which their service or application will be configured to interface.

At operation 616, the system is re-configured to interface with the second resource, at the deployment. For example, a service or application may transfer data to the second resource. Additionally, or alternatively, the service or application may transfer instructions which, when executed, generate data within the second resource. Additionally, or alternatively, a service or application may receive data from the second resource, such as one or more metrics related to how consumers are accessing, modifying, or otherwise interacting with the second resource (e.g., reading data, manipulating data, writing data, etc.).

The selection of the first resource or the second resource may be based on functionality or capabilities of each of the resources. For example, a user may desire for one or more metrics of their service to be tracked (e.g., data usage, times at which the service is accessed, geographic points at which the service is accessed, which data is being viewed by users, etc.). Different resources may provide access to different metrics or have different capabilities (e.g., memory, security, uplink speed, downlink speed, etc.) that a developer may find to be valuable. Accordingly, ease and portability of switching between different resources may also be valuable to developers.

Method 600 may terminate at operation 616. Alternatively, method 600 may return to operation 602 to provide an iterative loop of receiving keys corresponding to resources, define connections with the resources, based on the keys, and configuring a systems to interface with the resources, at a deployment of generated applications.

Figure 7:
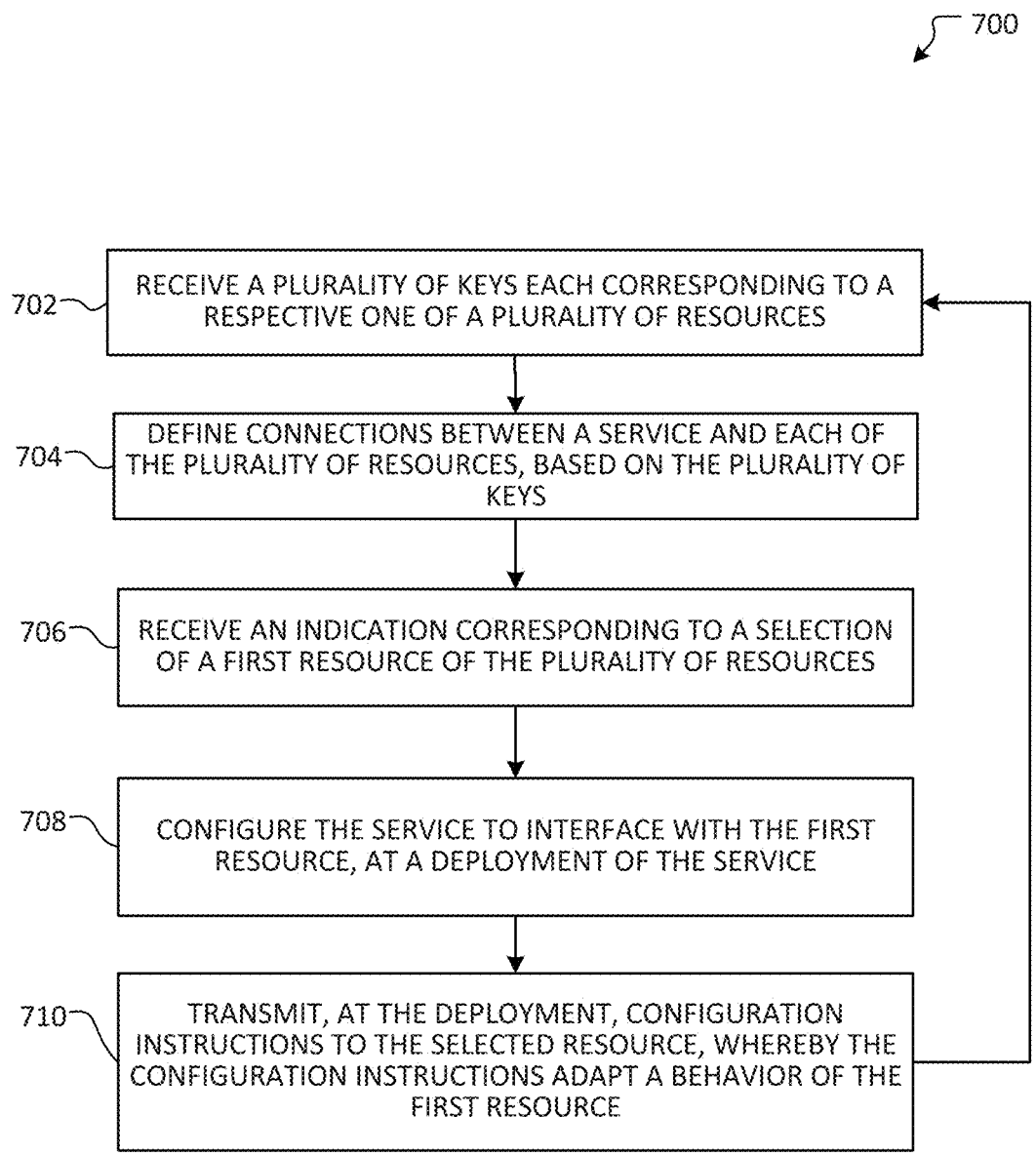
FIG. 7 illustrates an example method of using interchangeable non-compute resources according to aspects described herein.

FIG. 7 illustrates an example method 700 of using interchangeable non-compute resources. In examples, aspects of method 700 are performed by a device, such as computing device 102 and/or server 104, discussed above with respect to FIG. 1.

Method 700 beings at operation 702, where a plurality of keys are received that each correspond to a respective one of a plurality of resources (e.g., plurality of non-compute resources). The plurality of resources may be similar to the plurality of non-compute resources 108a, 108b, 108c or 430a, 430b, 430c discussed earlier herein with respect to FIGS. 1 and 4-5C. In some examples, one or more of the plurality of keys may be connection strings. The connection string may each be unique string value that corresponds to a user being able to access a corresponding one of the plurality of resources. In other examples, the one or more of the plurality of keys may be an integer, or a float value, or another data type that corresponds to a user being provided access to a resource.

At operation 704, a connection is defined between a service (e.g., service 410) and each of the plurality of resources (e.g., resources 430a, 430b, 430c), based on the plurality of keys. The connections may be instructions in a deployment manifest that, when executed, are configured to interface a service or application with one or more of a plurality of resources. The connections may be defined by one or more aspects of the resource connector component 112. For example, the one or more of the plurality of resources may be identified by the resource identification component 204 and/or a deployment manifest updated and/or generated by the deployment manifest component 208.

At operation 706, an indication corresponding to a selection of a first resource of the plurality of resources is received. The first resource may be, for example, one of resources 430a, 430b, or 430c discussed earlier herein with respect to FIGS. 4-5C. The indication may be received or generated by the resource selection component 202 described earlier herein with respect to FIG. 2. Generally, a user may select one of a plurality of resources (e.g., a first resource, a second resource, a third resource, etc.), with which their service or application will be configured to interface.

At operation 708, a service is configured to interface with the selected first resource, at a deployment of the service. For example, a service or application, such as service 410, may transfer data to the selected resource (e.g., resource 430a, 430b, 430c). Additionally, or alternatively, the service or application may transfer instructions which, when executed, generate data within the selected resource. Additionally, or alternatively, a service or application may receive data from the selected resource, such as one or more metrics related to how consumers are accessing, modifying, or otherwise interacting with the resource (e.g., reading data, manipulating data, writing data, etc.).

At operation 710, configuration instructions may be transmitted, at the deployment, to the first resource. The configuration instructions may adapt a behavior of the first resource. For example, when interfacing with one or more resources that are databases, the configuration instructions may adapt the one or more resources to define a new table. The new table may back a state store (e.g., a data store containing metadata corresponding to one or more data states and/or state operations). The configuration instructions may further adapt the one or more resources to perform operations on the database, such as read operations, transaction operations, encryption operations, or any other database operations that may be recognized by one of ordinary skill in the art.

The configuration instructions may be defined by a developer. Additionally, or alternatively, the configuration instructions may be stored and/or generated by the behavior adaption component 306 described earlier herein with respect to FIG. 3. Specifically, the behavior adaption component 306 may generate instructions corresponding one or more behaviors defined with respect to the behavior definition component 304.

FIGS. 8-11 and the associated descriptions provide a discussion of a variety of operating environments in which aspects of the disclosure may be practiced. However, the devices and systems illustrated and discussed with respect to FIGS. 8-11 are for purposes of example and illustration and are not limiting of a vast number of computing device configurations that may be utilized for practicing aspects of the disclosure, described herein.

Figure 8:
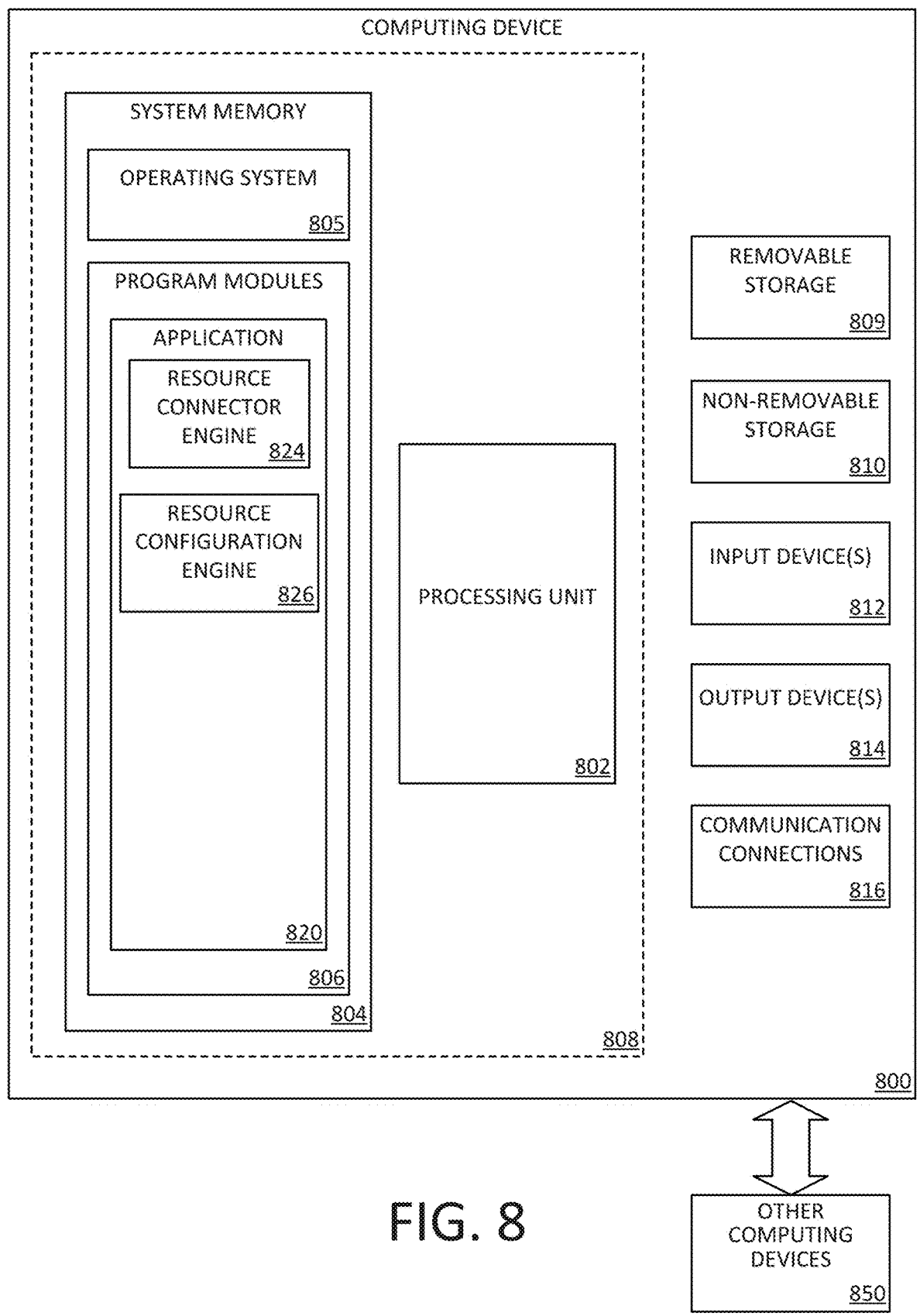
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices described above, including computing device 102 in FIG. 1. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories.

The system memory 804 may include an operating system 805 and one or more program modules 806 suitable for running software application 820, such as one or more components supported by the systems described herein. As examples, system memory 804 may store resource connector engine or component 824 and/or resource configuration engine or component 826. The operating system 805, for example, may be suitable for controlling the operation of the computing device 800.

Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 810.

As stated above, a number of program modules and data files may be stored in the system memory 804. While executing on the processing unit 802, the program modules 806 (e.g., application 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Some aspects of the disclosure may also be practiced using other technologies capable of performing logical operations such as, for example, AND, OR, and NOT, including but not limited to mechanical, optical, fluidic, and quantum technologies. In addition, some aspects of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816 allowing communications with other computing devices 850. Examples of suitable communication connections 816 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
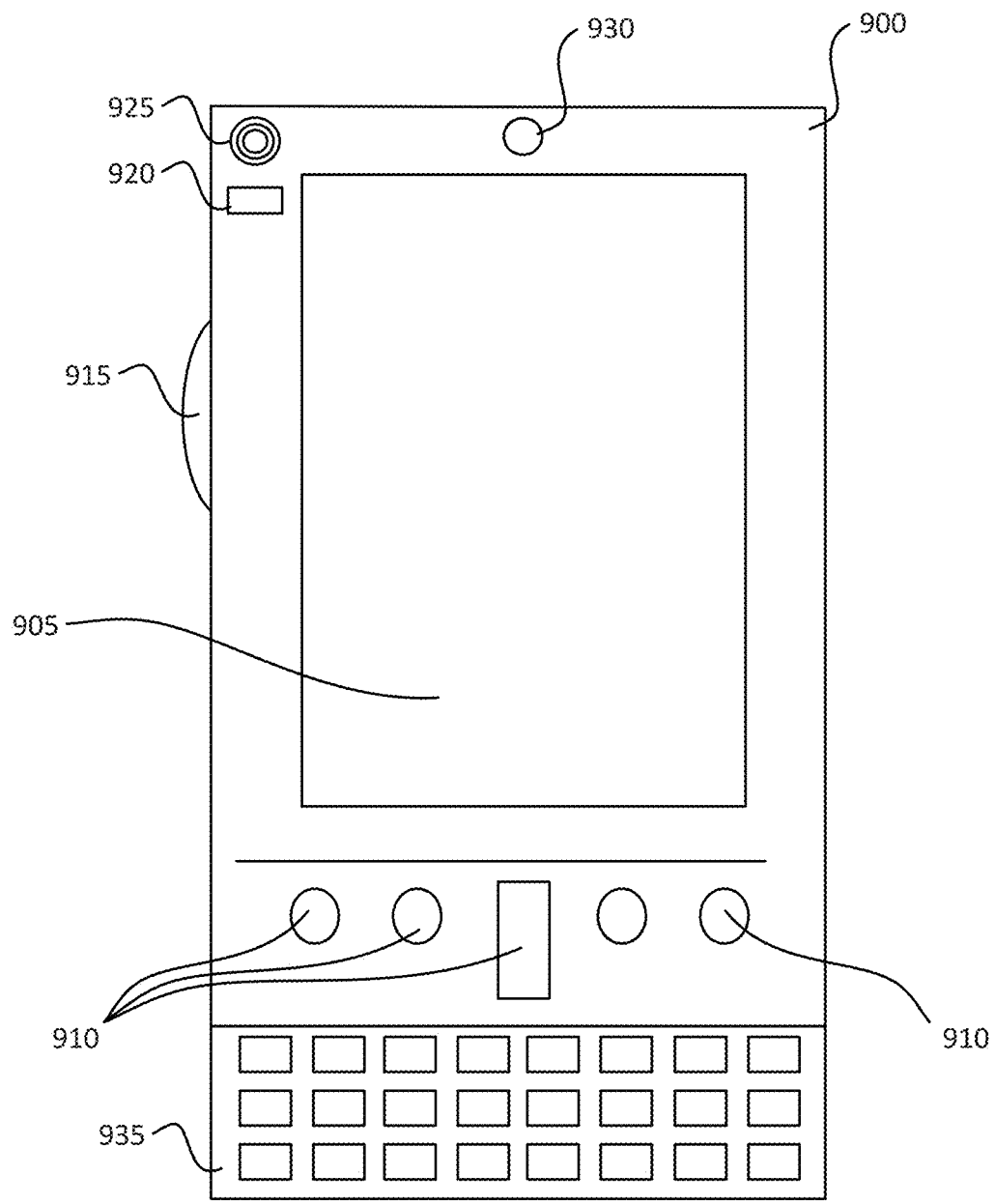
FIGS. 9A and 9B are simplified block diagrams of a mobile computing device with which aspects of the present disclosure may be practiced.
Figure 9B:
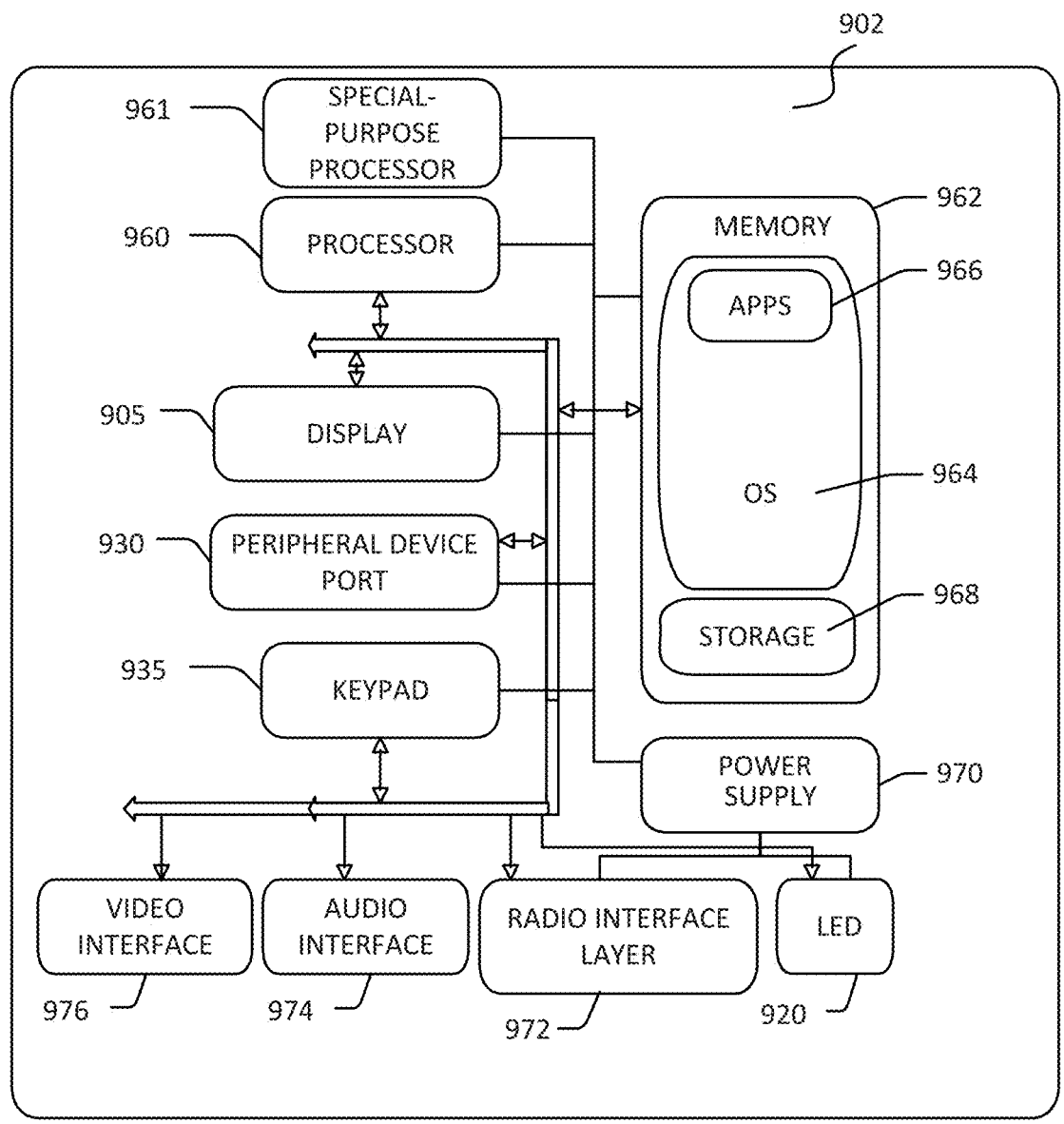

FIGS. 9A and 9B illustrate a mobile computing device 900, for example, a mobile telephone, a smart phone, wearable computer (such as a smart watch), a tablet computer, a laptop computer, and the like, with which some aspects of the disclosure may be practiced. In some aspects, the client may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display).

If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some examples.

In yet another alternative example, the mobile computing device 900 is a portable phone system, such as a cellular phone. The mobile computing device 900 may also include an optional keypad 935. Optional keypad 935 may be a physical keypad or a "soft" keypad generated on the touch screen display.

In various examples, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one aspect of a mobile computing device. That is, the mobile computing device 900 can incorporate a system (e.g., an architecture) 902 to implement some aspects. In some examples, the system 902 is implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., a resource connector engine, a resource configuration engine, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and/or special-purpose processor 961 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
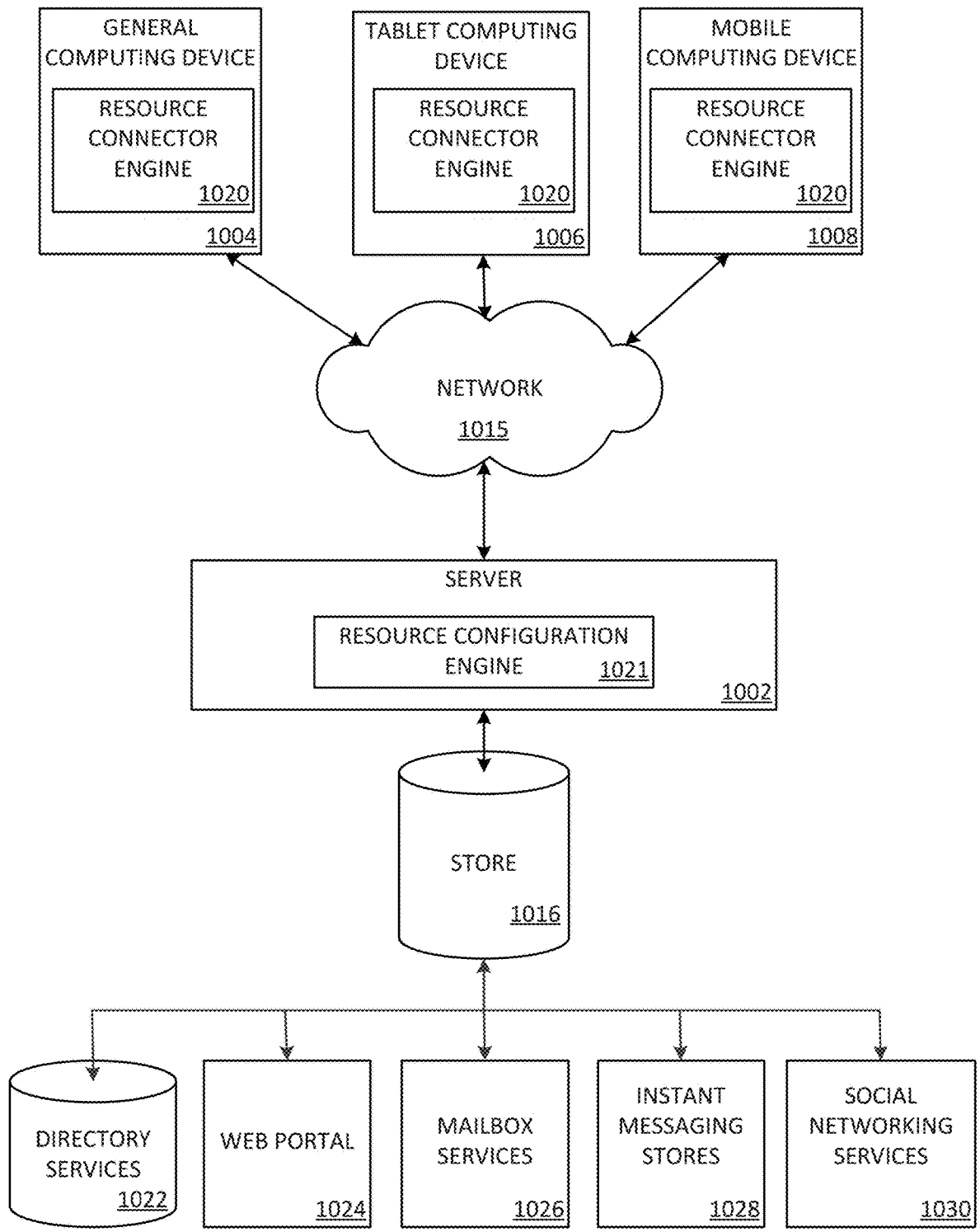
FIG. 10 is a simplified block diagram of a distributed computing system in which aspects of the present disclosure may be practiced.

FIG. 10 illustrates one aspect of the architecture of a system for processing data received at a computing system from a remote source, such as a personal computer 1004, tablet computing device 1006, or mobile computing device 1008, as described above. Content displayed at server device 1002 may be stored in different communication channels or other storage types. For example, various documents may be stored using a directory service 1024, a web portal 1025, a mailbox service 1026, an instant messaging store 1028, or a social networking site 1030.

A resource connector engine or component 1020 may be employed by a client that communicates with server device 1002. Additionally, or alternatively, a resource configuration engine or component 1021 may be employed by server device 1002. The server device 1002 may provide data to and from a client computing device such as a personal computer 1004, a tablet computing device 1006 and/or a mobile computing device 1008 (e.g., a smart phone) through a network 1015. By way of example, the computer system described above may be embodied in a personal computer 1004, a tablet computing device 1006 and/or a mobile computing device 1008 (e.g., a smart phone). Any of these examples of the computing devices may obtain content from the store 1016, in addition to receiving graphical data useable to be either pre-processed at a graphic-originating system, or post-processed at a receiving computing system.

Figure 11:
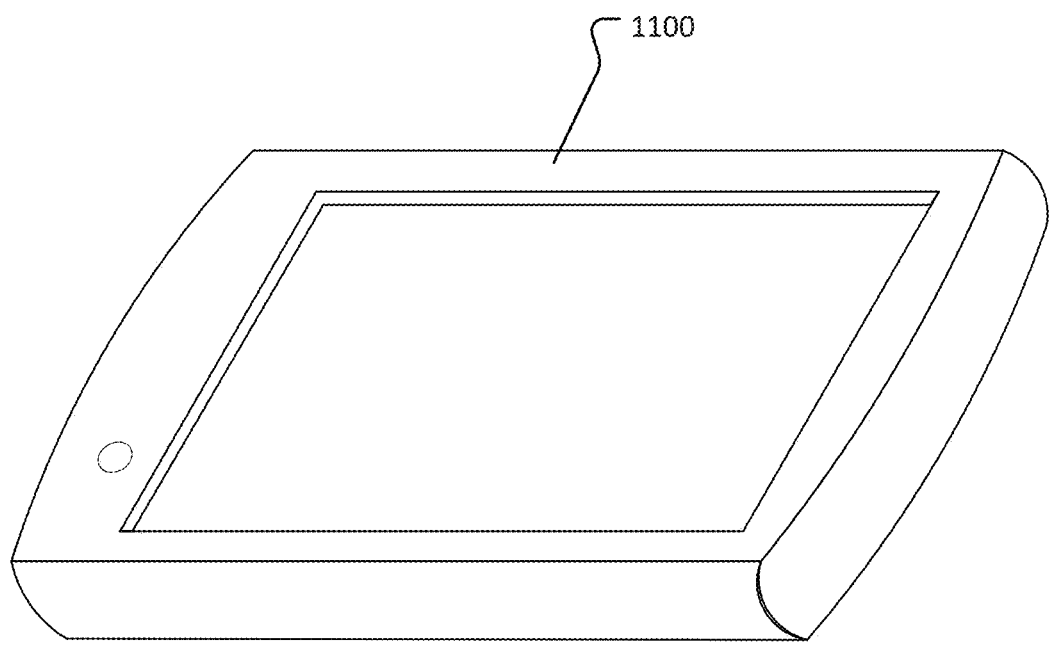
FIG. 11 illustrates a tablet computing device for executing one or more aspects of the present disclosure.

FIG. 11 illustrates an exemplary tablet computing device 1100 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the present disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use claimed aspects of the disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for using interchangeable non-compute resources, the system comprising:
    at least one processor;
    memory storing instructions that, when executed by the at least one processor, cause the system to:
        receive a first key corresponding to a first non-compute resource;
        establish a first connection with the first non-compute resource based on the first key;
        receive a second key corresponding to a second non-compute resource;
        establish a second connection with the second non-compute resource based on the second key;
        receive an indication corresponding to a selection of the first non-compute resource;
        configure the system to interface with the first non-compute resource at a deployment of a generated application, by updating a deployment manifest based on the selection of the first non-compute resource;
        receive an indication corresponding to a selection of the second non-compute resource; and
        re-configure the system to interface with the second non-compute resource at the deployment, by updating the deployment manifest based on the selection of the second non-compute resource,
        wherein the application is the same when the deployment manifest is updated based on the selection of the first non-compute resource as when the deployment manifest is updated based on the selection of the second non-compute resource.

2. The system of claim 1, wherein the first key and the second key are connection strings.

3. The system of claim 1, wherein receiving the first key corresponding to the first non-compute resource further comprises receiving a first set of authentication data corresponding to the first non-compute resource, and wherein defining the first connection between the service and the first non-compute resource, based on the first key, further comprises defining the first connection between the service and the first non-compute resource based on the first key and the first set of authentication data.

4. The system of claim 1, wherein the instructions, when executed by the at least one processor, further cause the system to:
    transmit, at the deployment, configuration instructions to the first non-compute resource, whereby the configuration instructions adapt a behavior of the first non-compute resource.

5. The system of claim 4, wherein the first non-compute resource is one of a database, caching system, or messaging queue.

6. A method of using interchangeable non-compute resources, the method comprising:
    receiving a first key corresponding to a first database;
    establishing a first connection between a service and the first database, based on the first key;
    receiving a second key corresponding to a second database;
    establishing a second connection between the service and the second database, based on the second key;
    receiving an indication corresponding to a selection of the first database;
    configuring the service to interface with the first database, at a deployment of the service, by updating a deployment manifest based on the selection of the first database;
    receiving an indication corresponding to a selection of the second database; and
    re-configuring the service to interface with the second database at the deployment, by updating the deployment manifest based on the selection of the second database,
    wherein the service is the same when the deployment manifest is updated based on the selection of the first database as when the deployment manifest is updated based on the selection of the second database.

7. The method of claim 6, wherein the first key and the second key are connection strings.

8. The method of claim 6, wherein the receiving of the first key corresponding to the first database further comprises receiving a first set of authentication data corresponding to the first database, and wherein the defining of the first connection between the service and the first database, based on the first key, further comprises defining the first connection between the service and the first database, based on the first key and the first set of authentication data.

9. The method of claim 6, further comprising:
    transmitting, at the deployment, configuration instructions to the first database, whereby the configuration instructions adapt a behavior of the first database.

10. The method of claim 9, wherein the first database is one or more of a cloud database, a relational database, a distributed relational database, or a sequel database.

11. The method of claim 6, wherein the configuring comprises configuring the service to be deployed from a compute resource, configured to perform computations via a processor, to the first database.

12. The method of claim 6, wherein the service comprises source code, and wherein the service being the same when the deployment manifest is updated based on the selection of the first database as when the deployment manifest is updated based on the selection of the second database comprises the source code of the service being the same when the deployment manifest is updated based on the selection of the first database as when the deployment manifest is updated based on the selection of the second database.

13. The method of claim 6, wherein the configuring and the re-configuring are performed via a resource connector.

14. The method of claim 6, wherein the re-configuring comprises re-configuring the system to interface with the second database at the deployment, instead of the first database, thereby breaking the interface with the first database.

15. A method of using interchangeable non-computer resources, the method comprising:
receiving a plurality of keys each corresponding to a respective one of a plurality of non-compute resources;
establishing connections between a service and each of the plurality of non-compute resources, based on the plurality of keys;
receiving an indication corresponding to a selection of a first non-compute resource of the plurality of non-compute resources;
configuring the service to interface with the first non-compute resource, at a deployment of the service, by updating a deployment manifest based on the selection of the first non-compute resource;
receiving an indication corresponding to a selection of a second non-compute resource of the plurality of resources;
re-configuring the service to interface with the second non-compute resource, at the deployment of the service, by updating the deployment manifest based on the selection of the second non-compute resource, wherein the service is the same when the deployment manifest is updated based on the selection of the first non-compute resource as when the deployment manifest is updated based on the selection of the second non-compute resource; and
transmitting, at the deployment, configuration instructions to the selected non-compute resource, whereby the configuration instructions adapt a behavior of the first non-compute resource.

16. The method of claim 15, wherein the receiving of the plurality of keys each corresponding to a respective one of a plurality of non-compute resources further comprises receiving a plurality of sets of authentication data, and wherein the defining of the connections between the services and the non-compute resources, based on the plurality of keys, further comprises defining the connections between the services and the non-compute resources, based on the plurality of keys and the sets of authentication data.

17. The method of claim 15, wherein at least one of the plurality of non-compute resources are one of a database, caching system, or messaging queue.

* * * * *